United States Patent [19]

Kawamura et al.

[11] Patent Number: 4,660,077
[45] Date of Patent: Apr. 21, 1987

[54] COLOR IMAGE FORMING APPARATUS

[75] Inventors: Naoto Kawamura, Yokohama; Katsuhito Dei, Tokyo, Japan

[73] Assignee: Canon Kabushiki Kaisha, Tokyo, Japan

[21] Appl. No.: 892,466

[22] Filed: Aug. 5, 1986

Related U.S. Application Data

[63] Continuation of Ser. No. 585,232, Mar. 1, 1984, abandoned.

[30] Foreign Application Priority Data

Mar. 8, 1983 [JP] Japan .................................. 58-37716

[51] Int. Cl.$^4$ ...................... H04N 1/46; G03G 15/01
[52] U.S. Cl. .......................................... 358/75; 355/4
[58] Field of Search ......................... 358/75, 78; 355/4

[56] References Cited

U.S. PATENT DOCUMENTS

| | | | |
|---|---|---|---|
| 2,986,466 | 5/1961 | Kaprelian | 358/75 |
| 4,007,489 | 2/1977 | Helmberger et al. | 358/78 |
| 4,233,612 | 11/1980 | Hirayama et al. | 346/160 |
| 4,517,591 | 5/1985 | Nagashima et al. | 358/75 |
| 4,521,805 | 6/1985 | Ayata et al. | 358/75 |
| 4,569,584 | 2/1986 | St. John et al. | 358/75 |

FOREIGN PATENT DOCUMENTS 0050481  4/1982  European Pat. Off. ............. 358/75

Primary Examiner—James J. Groody
Assistant Examiner—Randall S. Svihla
Attorney, Agent, or Firm—Fitzpatrick, Cella, Harper & Scinto

[57] ABSTRACT

A color image recording apparatus records color images on a recording medium and includes a plurality of image forming media and respective devices for forming respective images each of a different color on each of the image forming media. Transfer apparatus are provided for transferring the images respectively formed on the media onto a recording medium which is conveyed past the image forming media and the transfer apparatus by a recording medium conveyor. A detector generates a position signal that indicates that the recording medium is at a predetermined position on a predetermined path upstream of the first image forming medium, the image on which is to be first transferred to the recording medium. A circuit designates an area on the recording medium to which the respective images are to be transferred and a controller controls the start timing of the formation of a respective image on the first image forming medium by the image forming device in accordance with the position signal generated by the detector and the area on the recording medium designated by the designating circuit. Thus, transfer of the respective color images to the designated area on the recording medium is accomplished in proper registration so that a clear color image is produced.

5 Claims, 27 Drawing Figures

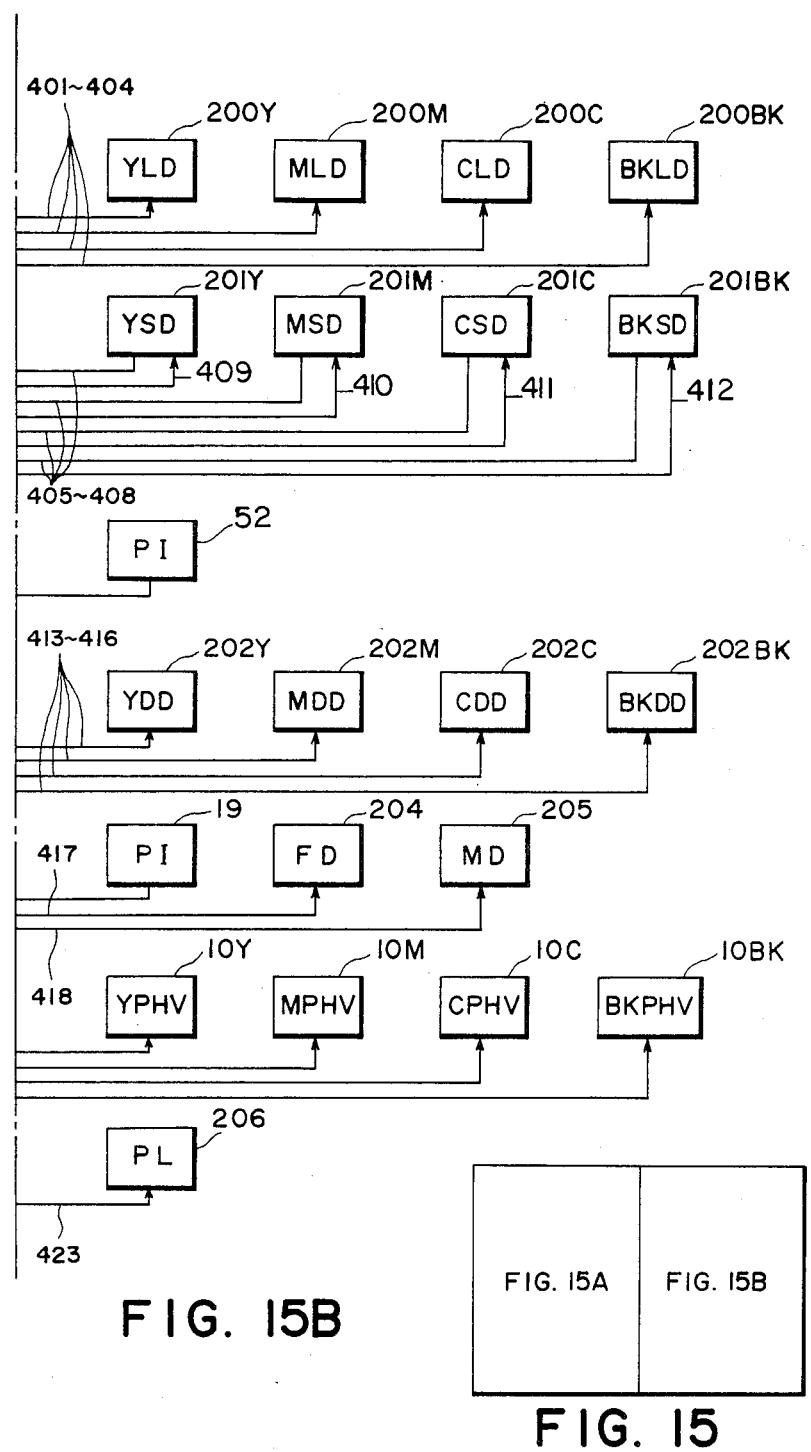

COLOR IMAGE FORMING APPARATUS

This application is a continuation of application Ser. No. 585,232, filed Mar. 1, 1984, now abandoned.

BACKGROUND OF THE INVENTION

1. Field of the Invention

The present invention relates to a color image recording apparatus and, more particularly, to a color image recording apparatus capable of recording a color image by sequentially forming images of a plurality of colors onto a recording medium.

2. Description of the Prior Art

A color image recording apparatus is known in which image recording is performed on a recording medium with cyan, magenta, yellow and black inks in accordance with respective color image signals obtained by color separation.

In a conventional apparatus of this type, image recording by each of the four different color inks is overlayed on the recording medium. For this reason, if the recording positions (timings) of the respective colors deviate from each other, the reproduced color image has a color mismatch and correct color reproduction cannot be expected.

It has been difficult to obtain good color image recording registration on a recording medium based on image signal outputs and to control carrying or conveying of the recording medium to the recording position in accordance with the obtained outputs.

SUMMARY OF THE INVENTION

The present invention has been made in consideration of the above-mentioned factor and has for its object to provide a color image recording apparatus which is capable of reproducing a color image free from color mismatch and of excellent quality.

It is another object of the present invention to provide a color image recording apparatus which allows the formation of images of a plurality of colors at desired positions for reproducing a color image on a recording medium.

It is still another object of the present invention to provide a color image recording apparatus which is capable of recording images of a plurality of colors and for recording a color image on a recording medium in accordance with a carried state of the recording medium.

The above and other objects and advantages of the present invention will become apparent from the following description when taken in conjunction with the accompanying drawings.

BRIEF DESCRIPTION OF THE DRAWINGS

FIG. 15 shows how FIGS. 15A and 15B are assembled to form a block diagram showing an example of a control circuit of a color LBP shown in FIG. 1.

DETAILED DESCRIPTION OF THE PREFERRED EMBODIMENTS

Figure 1:
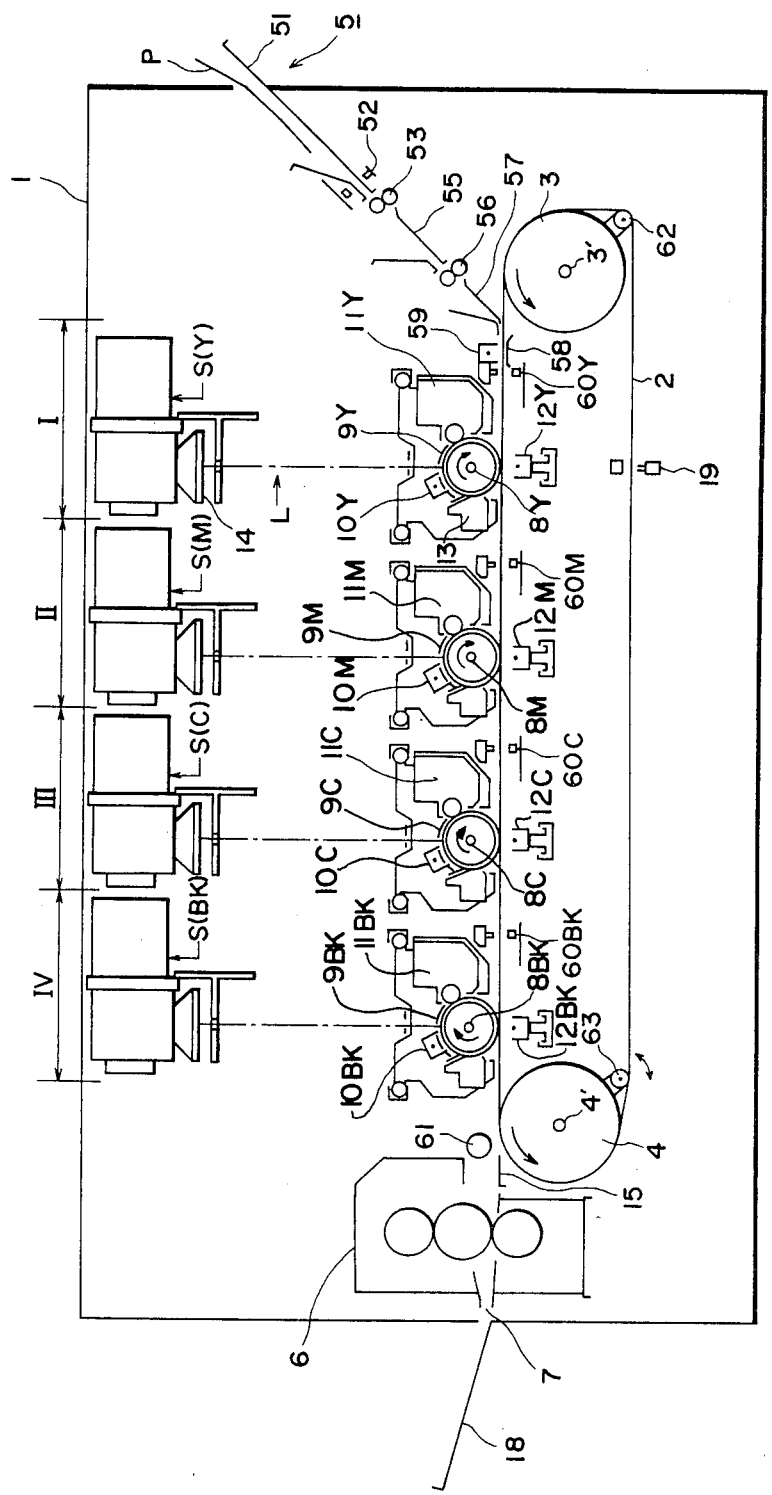
FIG. 1 is a diagram showing the construction of a color image recording apparatus according to an embodiment of the present invention.

FIG. 1 shows an embodiment of a color image recording apparatus of the present invention. The apparatus of this embodiment is a color laser beam printer (color LBP) which has four electrophotographic laser beam printer mechanisms as a plurality of image forming mechanisms. In a housing 1 of the apparatus, four laser beam printer mechanisms I, II, III and IV (to be referred to as printer mechanisms for brevity hereinafter) are arranged sequentially from the right side to the left side of the apparatus.

A pair of belt drive rollers 3 and 4 are arranged at a position in the housing 1 which is at a lower right position from the first printer mechanism I and a position in the housing 1 which is at a lower left position from the fourth printer mechanism IV. The belt drive rollers 3 and 4 respectively rotate about rotating shafts 3' and 4' with high precision. A screen belt 2 is looped around the belt drive rollers 3 and 4. The screen belt 2 can be a loop of a belt consisting of a Tetron mesh (polyethylene terephthalate). The screen belt 2 is driven in the direction indicated by the arrows by the drive rollers 3 and 4. A photointerrupter 19 detects the seam of the screen belt 2.

A paper feed mechanism 5 is arranged at the right side of the housing 1 and feeds a recording medium such as a paper sheet manually fed by the operator or the like to the printer mechanism. An image fixer 6 is arranged at the left end of the housing 1, a discharge port 7 receives the printed recording medium, and a discharge tray 18 stores the recording medium.

Since the respective printer mechanisms I to IV have substantially the same construction, the construction of only the printer mechanism I will be described. Thus, each printer mechanism comprises a drum-type electrophotographic photosensitive body (to be referred to as a drum hereinafter) 9 rotating in the direction indicated by the arrow about a shaft 8, and the following parts which are arranged in the order named along the direction of rotation of the drum 9, namely a primary charger 10, a developer 11, a transfer charger 12, a cleaner 13, and a laser beam scanner 14 arranged above the drum 9.

The laser beam scanner 14 comprises a semiconductor laser, a polygonal mirror, an f-θ lens, a baffle and other components. The laser beam scanner 14 receives a time-serial electrical digital pixel signal S(Y) (or S(M), S(C), S(BK) as explained below), which is obtained from an image reader or is calculated by a computer. The laser beam scanner 14 produces a laser beam L modulated in accordance with the input signal. The laser beam L scans the surface of the drum 9 which is charged by the primary charger 10 in a radial direction. Thus, an electrostatic latent image is formed on the drum 9 by a known electrophotographic process.

The developer 11 of the first printer mechanism I holds a developer for yellow Y, that of the second printer mechanism II holds a developer for magenta M, that of the third printer mechanism III holds a developer for cyan C, and that of the fourth printer mechanism IV holds a developer for black BK. The laser beam scanner 14 of the first printer mechanism I receives a pixel signal S(Y) corresponding to the yellow component of the color image, that of the second printer mechanism II receives a pixel signal S(M) corresponding to the magenta component, that of the third printer mechanism III receives a pixel signal S(C) corresponding to the cyan component, and that of the fourth printer mechanism IV receives a pixel signal S(BK) corresponding to the black component. The color combination of the printer mechanisms is not limited to this one, and any other combination suitable for an desired color recording can be used.

When power is supplied to the apparatus, the laser beam scanners 14 of the printer mechanisms I to IV and other process equipment components are energized or driven. The heaters of the fixers 6 are also energized, and the apparatus is set in the warm up mode. When the lasers are stable, the mirrors of scanners 14 reach a predetermined rotational speed and the fixing rollers reach a predetermined temperature, the respective printer mechanisms are ready for recording operation.

When the operator feeds a transfer sheet P as a recording medium onto a paper feed guide 51 of the paper feed mechanism 5, the leading end of the sheet P is detected by a photointerrupter 52 arranged in front of paper feed rollers 53. The photointerrupter 52 then generates a start signal (to start the printing sequence). In response to the start signal, the drums 9 of the respective printer mechanisms I to IV start rotating. The drive rollers 3 and 4 and the screen belt 2 are also driven.

The transfer sheet P is guided onto the driven screen belt 2 through the paper sheet rollers 53, a paper feed guide 55, register rollers 56, and a paper feed guide 57. The sheet P carried on the screen belt 2 is subjected to a corona discharge by an attracting charger 59, and is electrostatically attracted onto the screen belt 2. A grounded guide 58 of a conductor acts as an opposing electrode to the attracting charger 59 and opposes the charger 59 through the belt 2.

When the leading end of the transfer sheet P respectively shields the light of photointerrupters 60Y, 60M, 60C and 60BK of the respective printer mechanisms, the signals generated by the photointerrupters allow image formation on the corresponding drums 9. Thus, a yellow image as a component of the color image is formed on the drum 9 of the first printer mechanism I. A magenta image is formed on the drum 9 of the second printer mechanism II, a cyan image is formed on the drum 9 of the printer mechanism III, and a black image is formed on the drum 9 of the printer mechanism IV. Since the principle of image formation by the respective printer mechanism is well known, a detailed description thereof will be omitted.

As the screen belt 2 is rotated, the transfer sheet P is conveyed, passing below the first to fourth printer mechanisms I to IV, respectively. As the transfer sheet P passes by each printer mechanism, the corresponding transfer charger 12 transfers a corresponding image from the drum 9 at a corresponding position of the transfer sheet P. In other words, the yellow image formed on the drum 9 of the first printer mechanism I, the magenta image of the second printer mechanism II, the cyan image of the third printer mechanism III, and the black image of the fourth printer mechanism IV are sequentially overlayer or superimposed on the transfer sheet P. After passing through the fourth printer mechanism IV, the charge on the transfer sheet P is removed by a charge remover 61. The electrostatic attraction between the transfer sheet P and the screen belt 2 is diminished, and the transfer sheet P is separated from the belt 2.

After the transfer sheet P is separated from the belt 2, it is placed on a separation pawl 15 and is guided into the fixer 6, so that the image is fixed thereon by heat and pressure. The transfer sheet P is then discharged onto the tray 18 through the port 7.

After the transfer sheet P is completely discharged from the apparatus, all driving force except for the fixers 6 is stopped, and the printing sequence is terminated.

The photointerrupters 60Y, 60M, 60C and 60BK are arranged at intervals along the path of the transfer sheet P between adjacent printer mechanisms I to IV. These photointerrupters 60Y, 60M, 60C and 60BK detect the leading end of the transfer sheet P and individually determine the image formation timing of the corresponding mechanism.

Tension rollers 62 and 63 provide tension in the screen belt 2. The tension roller 62 is rotatable but is fixed in position. However, the tension roller 63 is rotatable and is movable in the direction indicated by the arrow.

The signal processing system for allowing the apparatus shown in FIG. 1 to perform the image recording operation will now be described.

Figure 2:
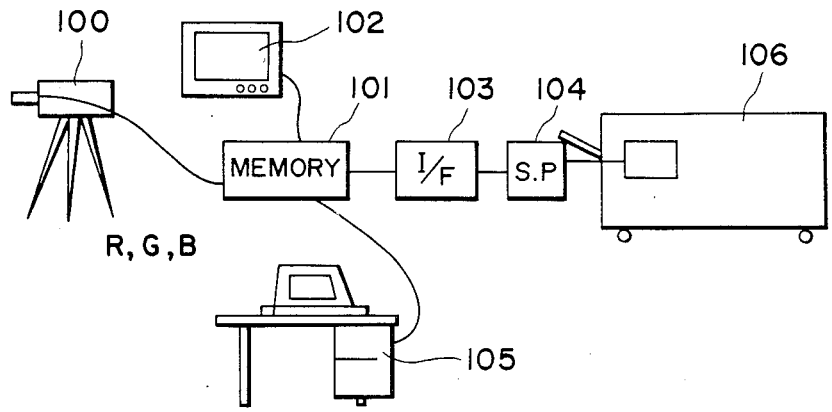
FIG. 2 is a block diagram of a system to which the apparatus shown in FIG. 1 is applied.

FIG. 2 is a block diagram of a system which uses the recording apparatus shown in FIG. 1. Three color image signals of red R, green G and blue B obtained by color separation from a three-tube type color TV camera 100 are subjected to analog to digital conversion of a predetermined bit number and the obtained digital signals are stored in a four-color frame memory 101. A monitor 102 comprising a color TV or the like allows monitoring of the image signals. The frame memory 101 is coupled to a computer 105. Processing or conversion such as gamma correction or masking of the data in the frame memory 101 is performed by the computer 105. The data in the frame memory 101 is supplied to a color LBP 106 shown in FIG. 2 through an interface (to be referred to as an I/F hereinafter) 103 and a signal processor (to be referred to as an S.P hereinafter) 104 in synchronism with a sync signal produced from the printer.

Figure 3:
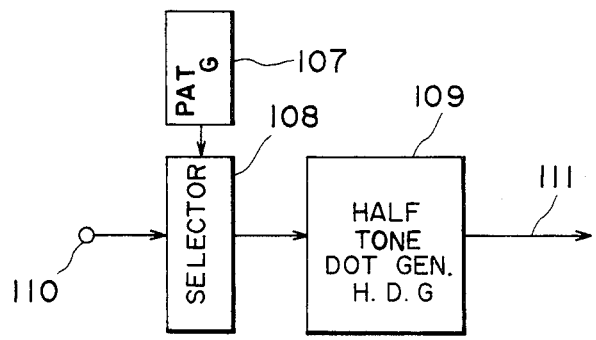
FIG. 3 is a block diagram of a signal processor S.P shown in FIG. 2.

FIG. 3 shows an example of the configuration of the S.P 104 shown in FIG. 2. The contents of input data 110 of a plurality of bits from the I/F 103 are supplied to a half tone dot generator (to be referred to as an H.D.G hereinafter) 109. The H.D.G 109 produces binary video data output 111. In this process, the dither method, to be described below, is adopted to produce a half tone color image. A selector 108 produces, from the input data 110, a specific pattern for position regulation in accordance with the output of a pattern generator (to be referred to as a PAT.G hereinafter) 107.

The dither method used for producing a half tone image as the operating principle of the H.D.G 109 will now be described. A threshold matrix will first be described.

Figure 4:
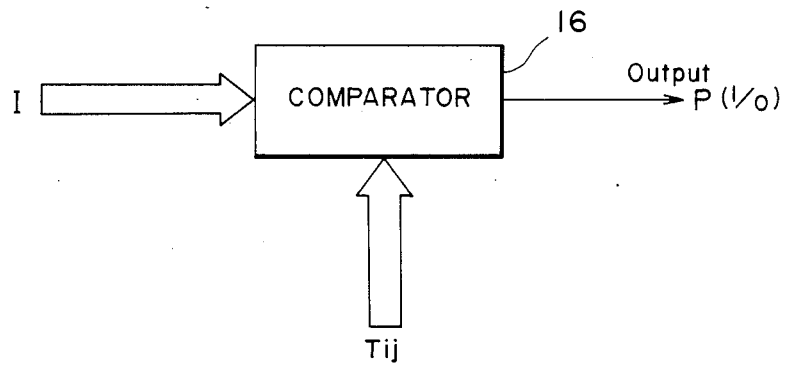
FIGS. 4, 5A and 5B are diagrams for explaining the dither method.

The threshold matrix provides a binary threshold for converting multibit input image data into single-bit (binary) video data. FIG. 4 shows a conversion method for performing this conversion. Input image data I is compared with an element Tij of a threshold matrix by a comparator 16. Based on the following conditions, the comparator 16 produces 1-bit output P:

$$\left. \begin{array}{l} \text{If } I \geq T_{ij}, P = 1 \\ \text{If } I < T_{ij}, P = 0 \end{array} \right\} \quad (1)$$

The output P from the comparator 16 is coupled to a monochrome printer.

Figure 5A:
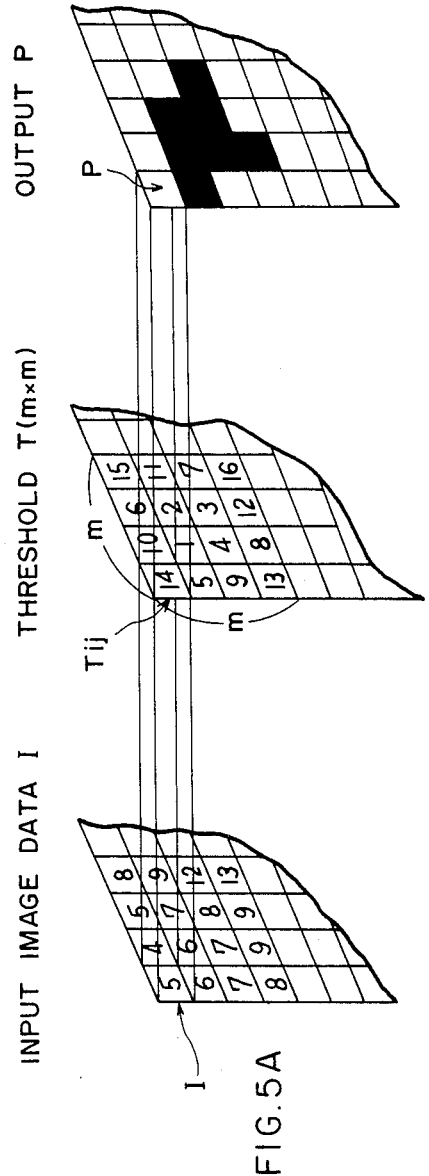
Figure 5B:
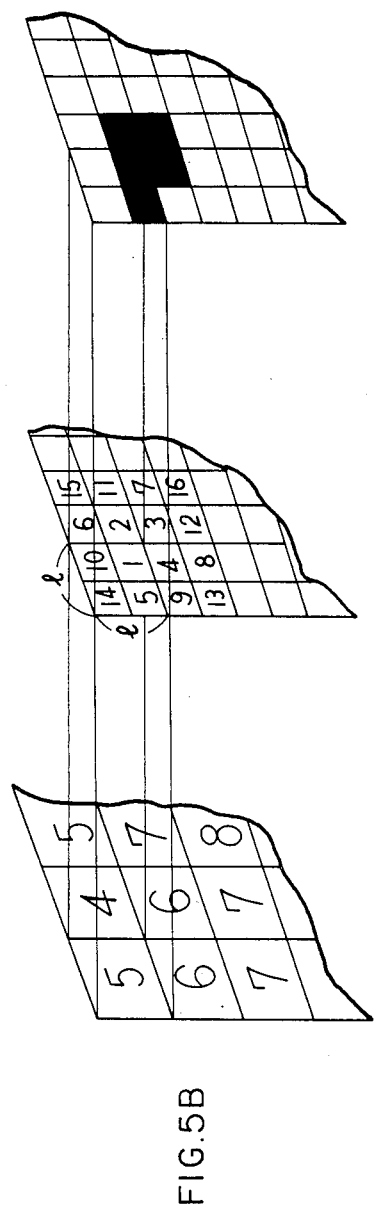

FIGS. 5A and 5B show this method in further detail. Each value I of the two-dimensionally distributed input image data is compared with the threshold matrix T, and the output P is obtained in accordance with the equations (1). The threshold matrix T in this example comprises m×m elements.

The method for comparing the input image data I with the threshold matrix T may be a method as shown in FIG. 5A wherein each value of the input image data I is compared with a corresponding element (one-to-one correspondence) of the threshold matrix T, or a method as shown in FIG. 5B wherein each image data I is compared with a submatrix 1×1 (2≦1) of the threshold matrix m×m.

The former method is called the dither method, and the latter method is generally called the density pattern method. However, these two methods do not basically differ from each other. Accordingly, in this specification, both methods, including the latter one, will be referred to as the dither method.

A pattern obtained as the output P by the dither method as described above is recorded in black and white and is therefore easy to reproduce. However, when only two value (black and white) recording can be performed, the number of gray levels which can be expressed is limited.

Accordingly, in this embodiment, the so-called multi-value output method realizing gray dot outputs between black and white is performed to allow production of halftone images of better quality.

Figure 6B:
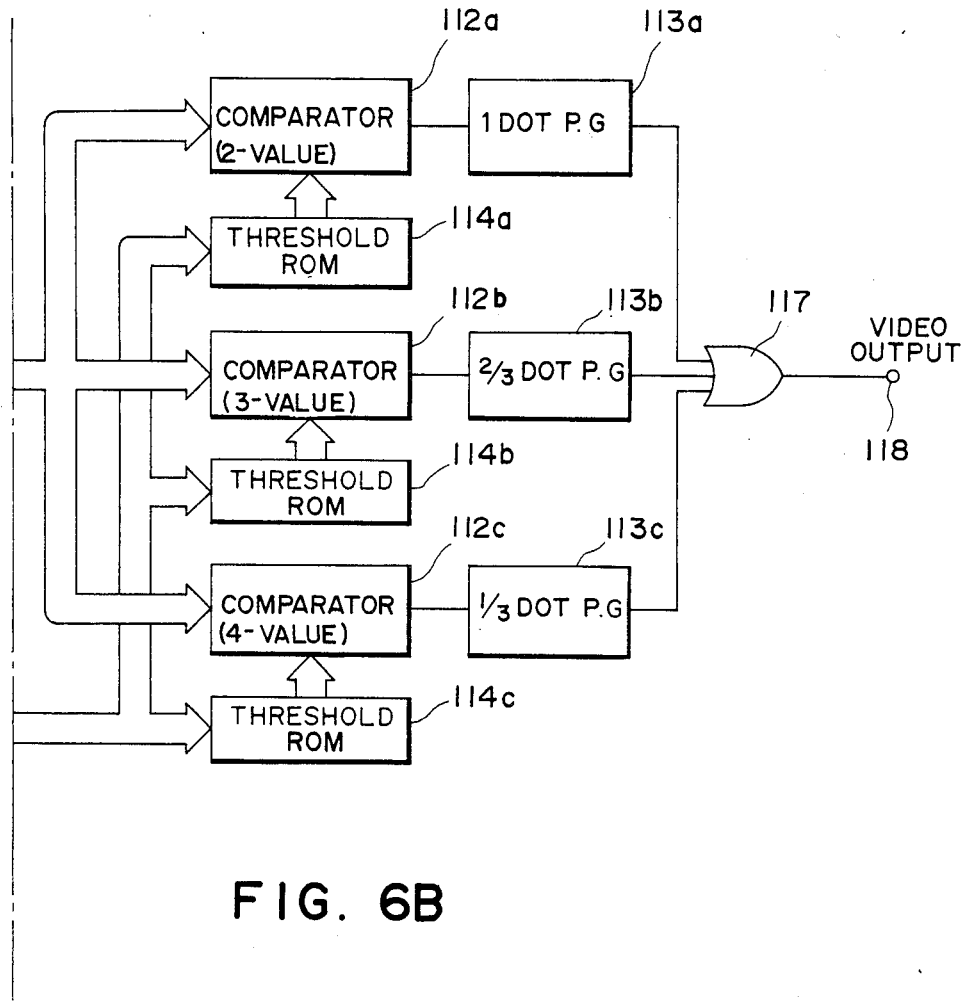
FIGS. 6A and 6B are assembled to form a block diagram of a half tone dot generator H.D.G shown in FIG. 3.
Figure 6:
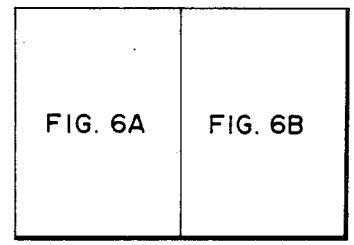
FIG. 6 shows how
Figure 6A:
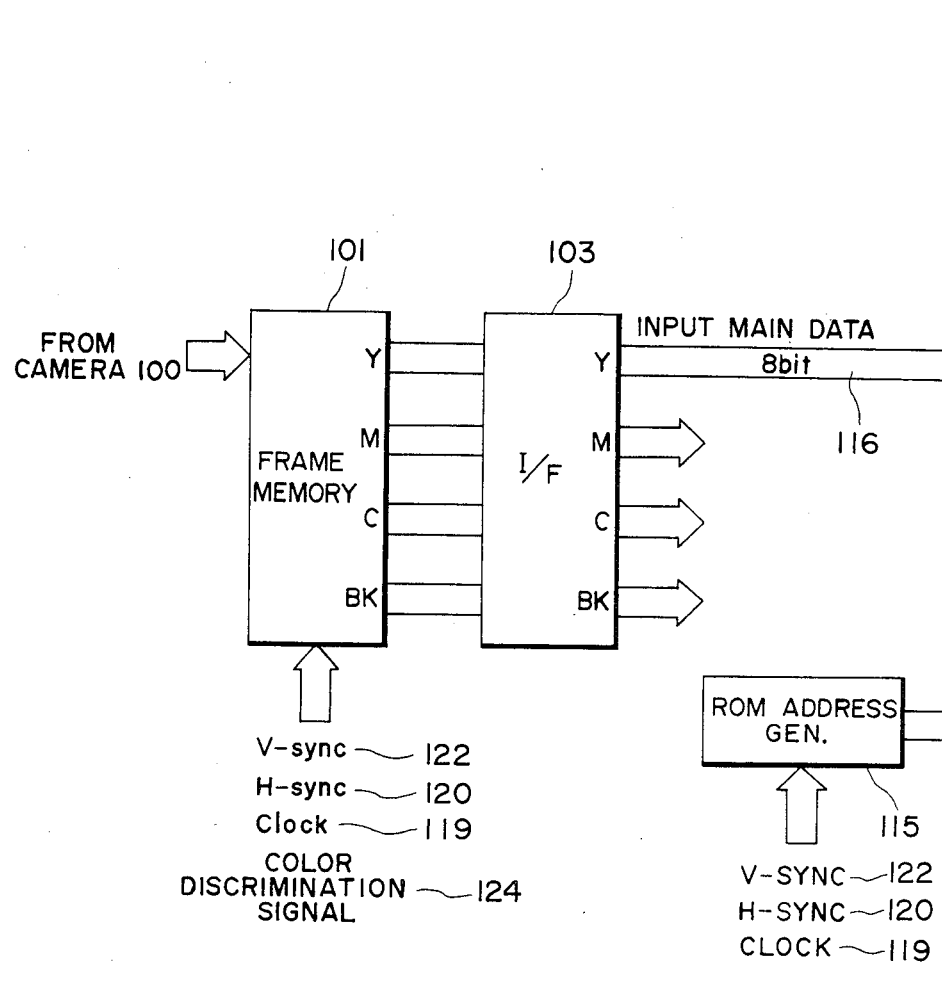

FIGS. 6A and 6B together show the configuration of the H.D.G 109 shown in FIG. 3 which adopts the four-value output method. This circuit performs processing for one color (e.g., yellow Y) among a plurality of color signals Y, M, C and BK. A similar configuration to that which will be described below can also be used for each of the remaining three color signals. 8-bit input image data 116 from the frame memory 101 is parallel-supplied to value comparators 112a, 112b and 112c, which respectfully can compare the image data to two, three, and four values, through the I/F 103 in synchronism with the image synchronizing clocks. The respective comparators 112a to 112c compare the input image data 116 with threshold data read out from ROMs 114a, 114b and 114c storing the threshold matrices at a predetermined timing. In accordance with the results of comparison, the respective comparators 112a to 112c produce outputs having pulse durations corresponding to 1 dot, $\frac{2}{3}$ dot and $\frac{1}{3}$ dot from 1 dot pulse generator 113a, a $\frac{2}{3}$ dot pulse generator 113b and a $\frac{1}{3}$ dot pulse generator 113c, respectively. The outputs having such different pulse durations achieve 4-value output in accordance with so-called pulse width modulation.

An OR circuit 117 synthesizes the three outputs and produces a two-value video signal 118. Such half tone processing is performed for each of a plurality of signals supplied to the H.D.G 109.

The data stored in the ROMs 114a to 114c are scanned in the main and subscanning directions by addressing by an ROM address generator 115 which receives a vertical sync signal V-SYNC 122 and a horizontal sync signal H-SYNC 12 and a clock 119 to be described later. Thus, different threshold data is read out from the ROMs 114a to 114c in synchronism with the input of image data.

The respective color image data from the frame memory 101 are selected by a color discrimination signal 124 and produced in accordance with the vertical sync signal V-SYNC 122, the horizontal sync signal H-SYNC 120, and the clock 119. The color discrimination signal 124 is generated in accordance with the signals from the photointerrupters 60Y, 60M, 60C and 60BK.

Figure 7:
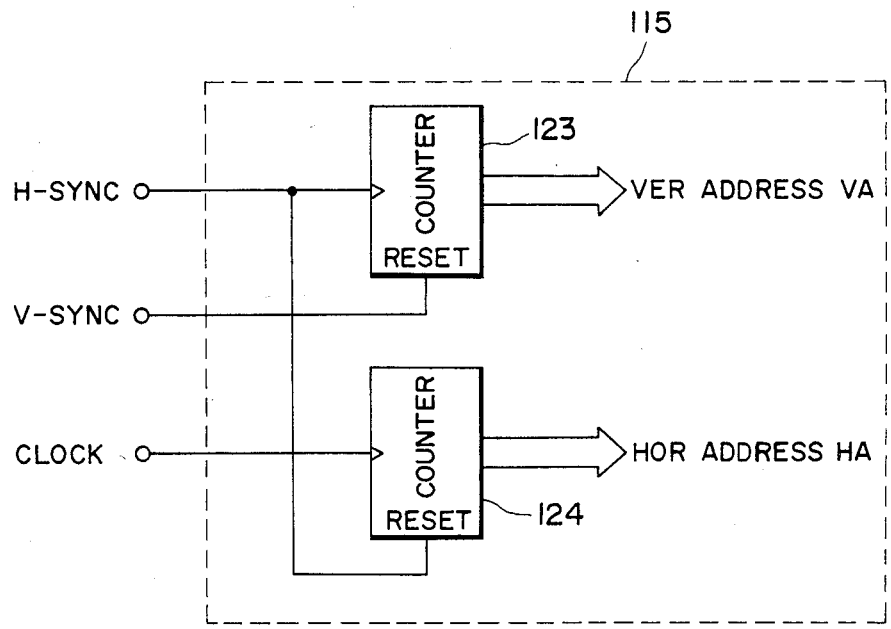
FIG. 7 is a block diagram of an ROM address generator shown in FIG. 6A.

FIG. 7 shows the configuration of a ROM address generator 115. The ROM address generator 115 consists of counters 123 and 124. The counter 123 is reset by the vertical sync signal V-SYNC 122 and counts the horizontal sync signal H-SYNC 120. The counter 124 is reset by the horizontal sync signal H-SYNC 12 and counts image clocks CLOCK for image synchronization which are used for reading out the image data from the frame memory 101. Each threshold value of the threshold matrix stored in the ROMs 114a to 114c is addressed in synchronism with the input image data using an output from the counter 123 as a vertical address VA and an output from the counter 124 as a horizontal address HA.

The multi-value output obtained based on pulse width modulation for each color at the H.D.G 109 is stable.

The timing at which the image signal is supplied from the frame memory 101 to the laser beam printer 106 through the S.P 104 will now be described.

Figure 8:
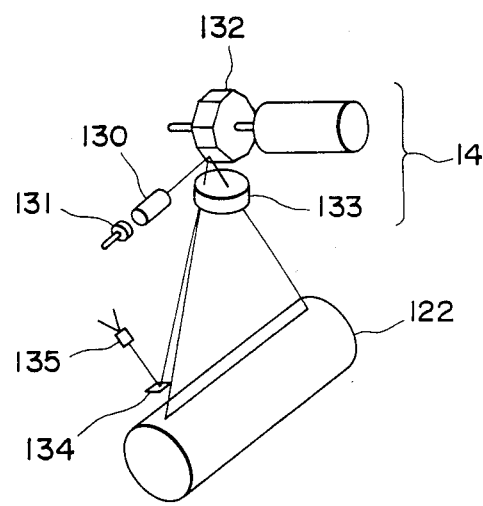
FIG. 8 is a perspective view of a laser scanner shown in FIG. 1.

FIG. 8 is a schematic perspective view of one of the four laser scanners 14 shown in FIG. 1. A laser beam modulated by a semiconductor laser 131 is collimated by a collimating lens 130 and deflected by a polygonal mirror 132. The deflected laser beam is focused by an f-θ lens (imaging lens) 133 to scan a photosensitive drum 122. When such beam scanning is performed, the leading edge of one line is reflected by a mirror 134 and is guided to a detector 135. As is well known, a detection signal from the detector 135 is used as an ID (index) signal of the image signal or as a horizontal output timing control signal (horizontal indexing signal). This signal will be referred to as a signal BD hereinafter.

The vertical and horizontal paper feed timings are determined in the following manner. Referring to FIG. 1, an input to each printer mechanism is obtained by detecting the leading end of a transfer sheet P moving on the screen belt 2 by means of the photointerrupters 60Y, 60M, 60C and 60BK. For this purpose, the belt 2 comprises a transparent or translucent material.

Figure 9:
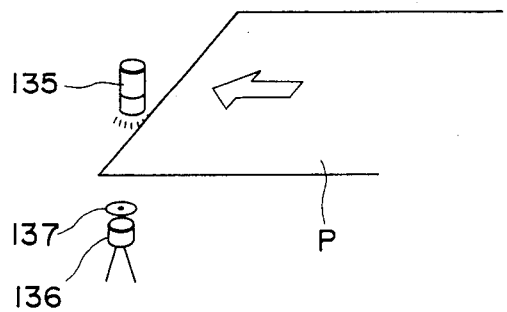
FIG. 9 is a circuit diagram showing the configuration of a photointerrupter 60.

FIG. 9 shows the mechanism for this timing detection. A pinhole plate 137 with a pinhole is inserted between a lamp 135 and a detector 136 making up each photointerrupter 60Y, 60M, 60C, or 60BK. When the transfer sheet P is passed through the space between the lamp 135 and the detector 136, light transmitted from the lamp 135 toward the detector 136 is blocked. The transfer sheet P preferably passes as close as possible to the pinhole plate 137.

Figure 10:
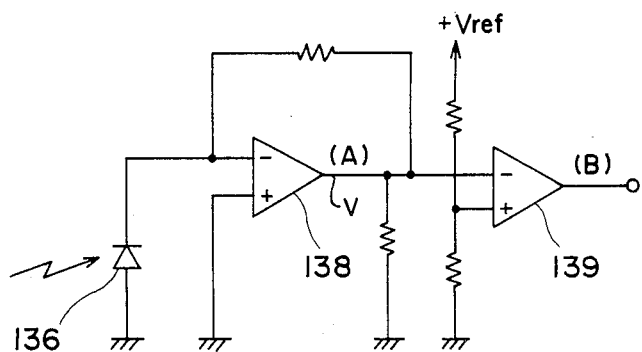
FIG. 10 is a circuit diagram for a detector 136.
Figure 11:
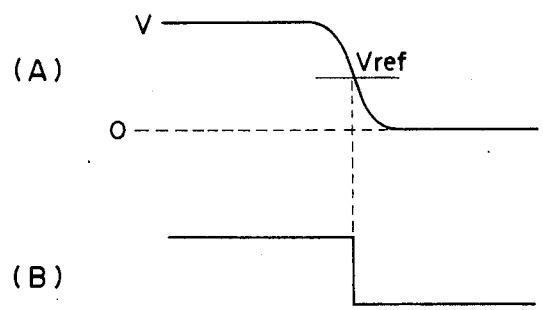
FIG. 11 is a timing chart of the output waveform of the circuit shown in FIG. 10.

FIG. 10 shows a circuit diagram of the detector 136. When light is irradiated onto the detector 136 through the pinhole of the pinhole plate 137, an operational amplifier 138 obtains an output A by a photocurrent. When the transfer sheet is fed, the output V becomes zero. Output A from the operational amplifier 138 as shown in FIG. 11(A) is compared with a changeable threshold level Vref by a comparator 139. The comparator 139 produces an output as shown in FIG. 11(B). Thus, the fall signal of the output shown in FIG. 11(B) can be used as a sync signal for vertical recording control. This signal will be referred to as a signal Top. A photointerrupter is preferably included for each color, as in the case shown in FIG. 1. When paper feed is for normal size recording, a signal Top for the first drum is output, and signals Top for the remaining colors are output with reference to this signal as the sheet moves.

Figure 12:
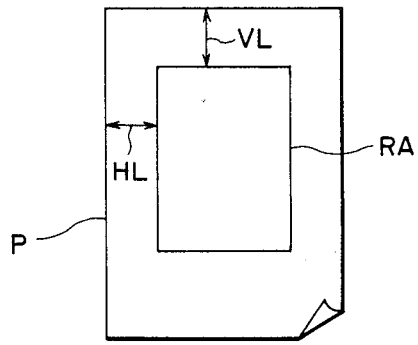
FIG. 12 is a diagram showing an effective portion RA of a transfer sheet P.

In this manner, a signal Top and a signal BD are output for each color or drum. The area in which such signals Top and BD are obtained is different from the actual recording area of the transfer sheet. FIG. 12 shows the actual recording area RA in relation to the size of the transfer sheet P which is called an effective area. VL is the distance from the leading edge of the sheet P to the effective area RA and HL is the distance from the side edge of the sheet P to the effective area RA.

Image signals are supplied to the respective laser beam scanners 14 so as to record images only in the effective area. The horizontal and vertical sync signals V-SYNC and H-SYNC are used for this synchronization.

Figure 13:
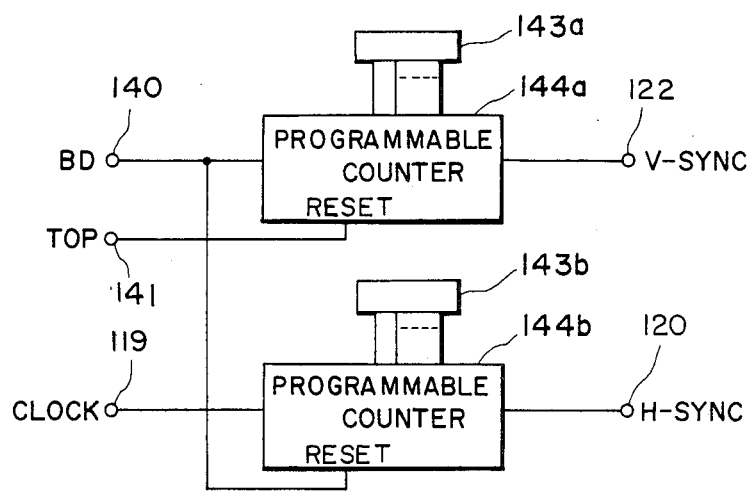
FIG. 13 is a block diagram showing an example of a circuit for forming a signal V-SYNC and a signal Y-SYNC.

FIG. 13 shows a method for preparing these signals V-SYNC and H-SYNC. A signal V-SYNC 122 is obtained in the following manner. First, in response to a signal Top 141, signals BD 140 are counted by a programmable counter 144a. When the count of the programmable counter 144a reaches a predetermined value corresponding to a distance VL from the leading edge of the transfer sheet P to that of the effective area RA (FIG. 12), the programmable counter 144a produces the signal V-SYNC 122. A signal H-SYNC 120 is obtained in the following manner. In response to the signal 140 BD, pixel clocks 119 (or clocks having a frequency N times that of the pixel clocks for higher precision) are counted by a programmable counter 144b. When the count reaches a predetermined value corresponding to a distance HL from the side edge of the transfer sheet P to that of the effective area RA (FIG. 12), the programmable counter 144b produces the signal H-SYNC 120. With reference to the thus obtained signals V-SYNC and H-SYNC, image data of the corresponding colors are read out from the frame memory 101. The readout data is subjected to half tone processing. The resultant image data is produced to drive the laser beam scanners 14. Then, the image is recorded only in the effective area RA. The above-mentioned signals are obtained separately for each of the colors Y, M, C and BK.

Programmable counter 144a is reset by the signal Top 141 and programmable counter 144b is reset by signal BD 140.

The preset counts of the programmable counters 144a and 144b can be controlled by switches 143a and 143b which operate in response to an input from a registration correction key (not shown) arranged on a control panel. When desired preset counts are set in the programmable counters 144a and 144b by the switches 143a and 143b, the registration control in the conveyance direction of the transfer sheet P and a direction perpendicular thereto can be performed independently for each color. In this manner, color misregistration for each color can be easily corrected.

Figure 14:
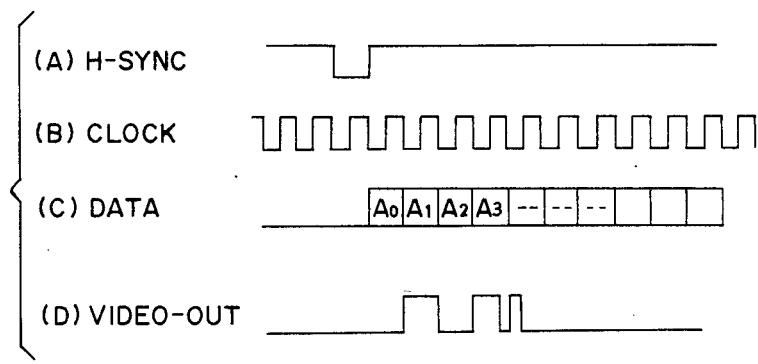
FIG. 14 is a timing chart showing data processing timing.

FIG. 14 shows the timing of data (DATA) processing at the S.P 104 shown in FIG. 2 based on signals V-SYNC and H-SYNC. The state shown in FIG. 14 is that after the signal V-SYNC is input. Image data (DATA) A0, A1, A2, ..., shown in FIG. 14(C) are supplied from the frame memory 101 to the S.P 104 through the I/F 103 in response to the signal H-SYNC shown in FIG. 14(A) generated immediately after input of the signal V-SYNC and in synchronism with the clocks (sync signals for respective pixels) shown in FIG. 14(B).

The processing clocks of the data DATA are different depending upon whether or not the dither method or density pattern method is adopted. In the dither method, the image input and processing clocks are the same.

FIG. 14(D) shows a pulse-width-modulated signal VIDEO-OUT after half dot processing (dither processing) which is produced from the S.P 104. The pulse-width-modulated signal is thus obtained to drive the laser drive circuit. The laser beam from the laser is turned on or off in accordance with the pulse width.

In this manner, the image write (readout of data from the frame memory 101 in this embodiment) of the image on the photosensitive drum with a laser beam is controlled by a signal V-SYNC which is obtained by delaying by a predetermined time period a signal Top formed upon detection of the leading end of the recording medium conveyed on a predetermined conveyance path, and by a signal H-SYNC which is similarly obtained by delaying by a predetermined time period a signal BD upon detection of a scanning position of the laser beam. The delay output timings of the signals V-SYNC and H-SYNC can be separately set for each of the four printer mechanism for forming a color image. Accordingly, fine adjustment of color imbalance, that is registration correction, can be performed with ease.

Figure 15A:
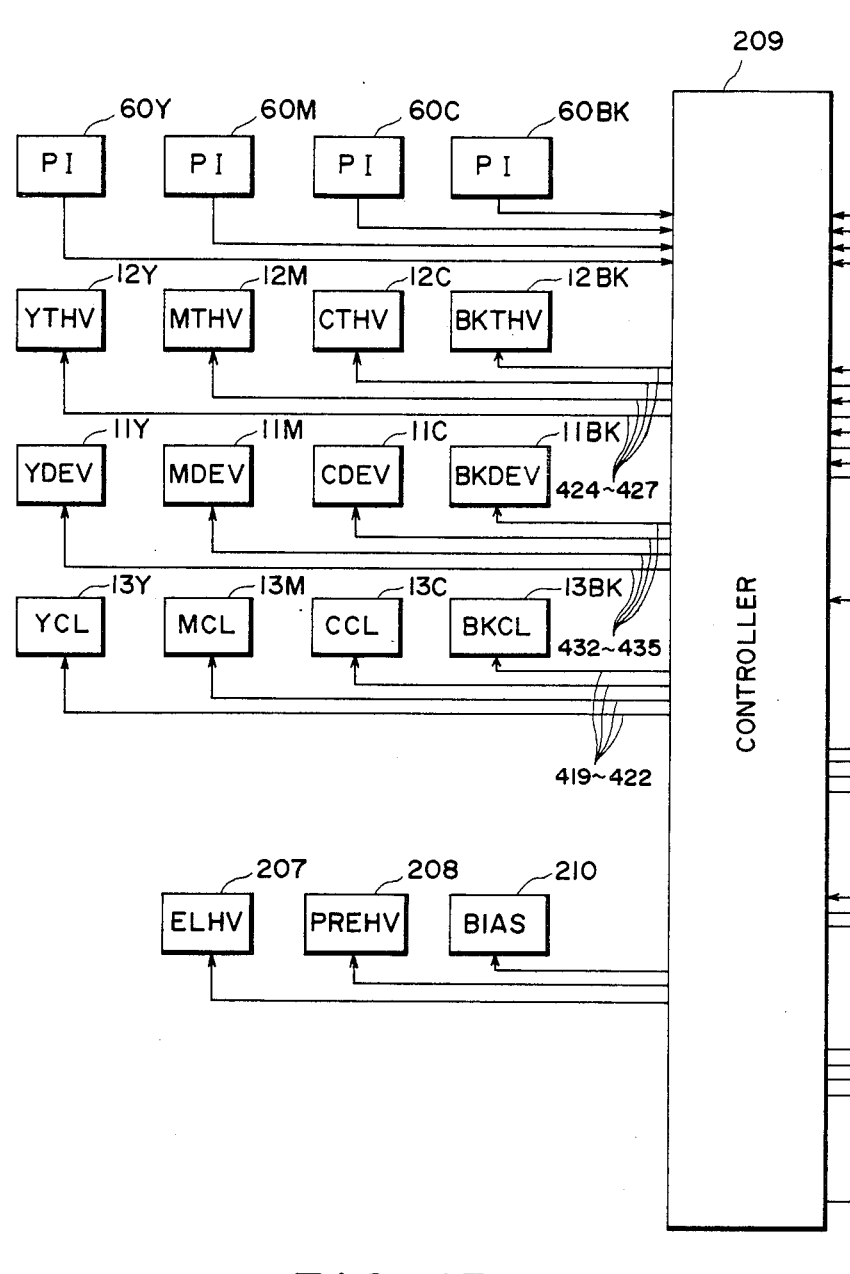

The operation sequence of the color LBP of this embodiment will now be described. FIGS. 15A and 15B constitute an overall block diagram. Symbols Y, M, C and BK attached to the respective blocks indicate that the corresponding blocks are associated with processing for yellow, magenta, cyan and black colors. Referring to FIGS. 15A and 15B, laser drive circuits 200Y, 200M, 200C and 200BK are for driving the lasers 131 as shown in FIG. 8. Mirror drive circuits 201Y, 201M, 201C, and 201BK are for driving the polygonal mirrors 132 as shown in FIG. 8. The photointerrupter 19 detects the seam of the screen belt 2. The photointerrupter 52 detects whether the transfer sheet P has been manually fed on the paper feed guide 51 by the operator. Drum drive circuits 202 are for driving the drum motors. A paper feed motor drive circuit 204 is for driving the paper feed motor. A main motor drive circuit 205 is for driving the main motor. A paper feed plunger 206 is for driving the paper feed rollers 53. A high voltage source ELHV 207 supplies power to the charge remover 61 shown in FIG. 1. A high voltage source PREHV 208 supplies power to the attracting charger 59 shown in FIG. 1 for attracting the transfer sheet toward the belt 2. A controller 209 includes a known microcomputer. A developer bias source BIAS 210 is for biasing the developer 11. Blocks PI are the photo interrupters 60Y, 60M, 60C, and 60BK. YTHV, MTHV, CTHV, AND BKTHV are high voltage sources for the transfer chargers 12 for the respective colors Y, M, C and BK. YDEV, MDEV, CDEV, and BKDEV are voltage sources for the developers 11; and YCL, MCL, CCL, and BKCL are voltage sources for the cleaners 13.

FIGS. 16A and 16B and 17A, 17B and 17C are flow charts showing the program for performing sequence control.

When power is turned on, initial setting of the microcomputer included in the controller 209 and interruption processing condition setting are performed in steps 300 and 301. In step 300, setting of the stack pointer or allocation of I/Os is performed. In step 301, designation of jump destinations or of interrupt devices for interruption is performed. The laser drive circuit 200 has a function of temperature control of the semiconductor laser 131. Therefore, in steps 302 and 303, it is confirmed that temperature control has been completed by signals on signal lines 401 to 404. After so confirming, the mirror drive circuits 201Y, 201M, 201C and 201BK are turned on by producing a mirror drive signal onto signal lines 409 to 412, thereby driving the polygonal mirrors 132, in step 304. In steps 335 and 336, the signals on signal lines 405 to 408 are detected to determine the operational state of the polygonal mirrors 132 so as to confirm that the rotation of the polygonal mirrors 132 has reached a predetermined speed. Steps 305 and 306 are included for checking if the subsequent sequence control is to be started. In this embodiment, this is determined by referring to the output from the photointerrupter 52 which shows whether the transfer sheet P has been inserted by the operator. When it is determined that the transfer sheet P has been inserted onto the paper feed guide 51, the flow advances to step 307. Signals are produced onto signal lines 413 to 416 for driving the photosensitive drums 9. Then, a drum drive circuit 202 is turned on to start drum rotation. Steps 307 to 313 need not be performed in the sequence shown in FIG. 16A but can be performed in an irregular order or simultaneously. Alternatively, if so desired, time adjustment can be made between the respective steps, while the program sequence is performed in accordance with these steps. In step 308, the paper feed motor drive circuit 204 for conveying or carrying an inserted transfer sheet P onto the screen belt 2 driven by the main motor drive circuit 205 is turned on by supplying a signal onto a signal line 417. In step 309, the main motor drive circuit 205 for driving the main motor and thus the screen belt 2 which conveys the conveyed transfer sheet P to the discharge port 7 while performing image transfer is turned on by supplying a signal onto a signal line 418. In step 310, the cleaners 13 for cleaning the photosensitive drums 9 are turned on by supplying a signal onto signal lines 419 to 422. In steps 311 to 313, the primary charger 10, the developer bias source 210, and the charge remover 61 required for the electrophotographic process are all turned on.

The paper feed rollers 53 belonging to the paper feed guide 51 are connected to the paper feed plunger 206 through a clutch (not shown). Since the paper feed plunger 206 is still OFF, as will be described later, power from the motor has not yet been supplied to the paper feed rollers 53. Therefore, the inserted transfer sheet P remains at the paper feed guide 51. Upon the start of movement of the screen belt 2 in step 309, detection of the position of the belt 2 is performed based on the output from the photointerrupter 19 in steps 314 and 315, so as to feed the inserted transfer sheet P onto a predetermined position on the screen belt 2, for example, a position a predetermined distance from the seam of the belt 2. After so detecting the position of the seam of the belt 2 in steps 314 and 315, time adjustment is performed in step 316 in order to convey the sheet to the position the predetermined distance from the seam. Thereafter, in step 318, a signal is supplied onto a signal line 423 to turn on the paper feed plunger 206 described above, and to rotate the paper feed rollers 53. Step 317 need not be performed between steps 316 and 318 but can be performed at any suitable time so as to turn on the transfer charger 12 by supplying a signal onto signal lines 424 to 427. The preprinting process is completed in steps 305 to 318. Thereafter, the actual image recording operation is performed in accordance with image data which is supplied in synchronism with signals V-SYNC and H-SYNC. This interrupt is performed by a timer in this embodiment. Accordingly, the interrupt timer is started in step 319.

Figure 16B:
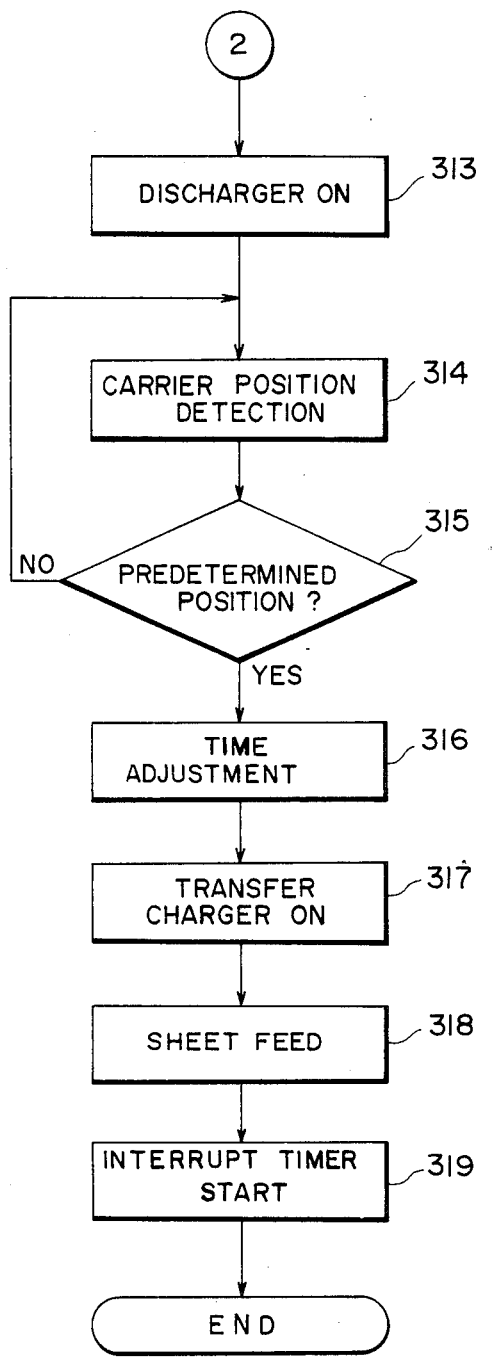
FIGS. 16A and 16B are assembled to form a flow chart showing a sequence of control operation.
Figure 16:
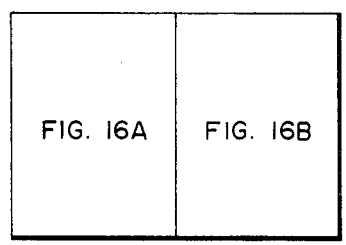
FIG. 16 shows how
Figure 16A:
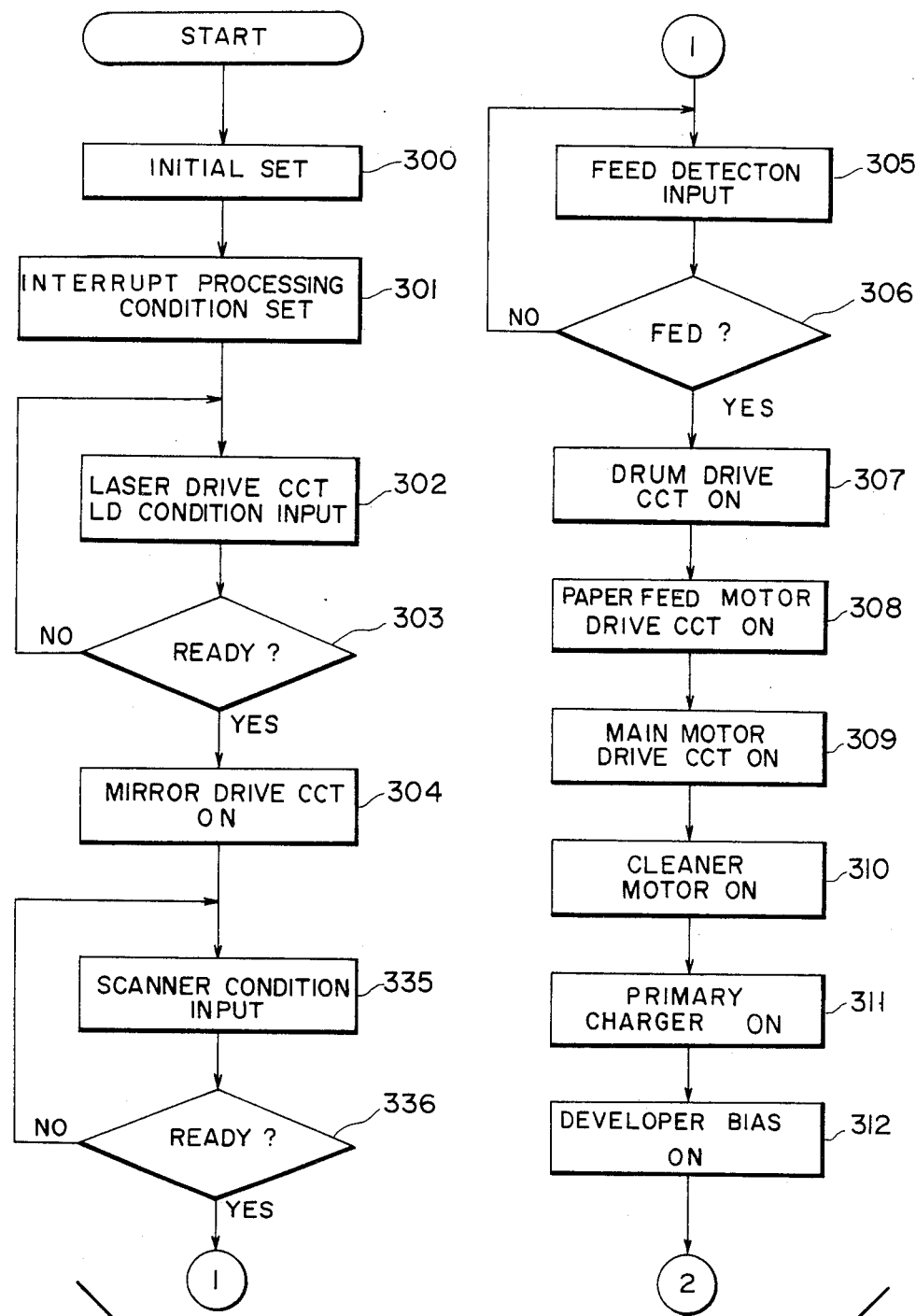
Figure 17C:
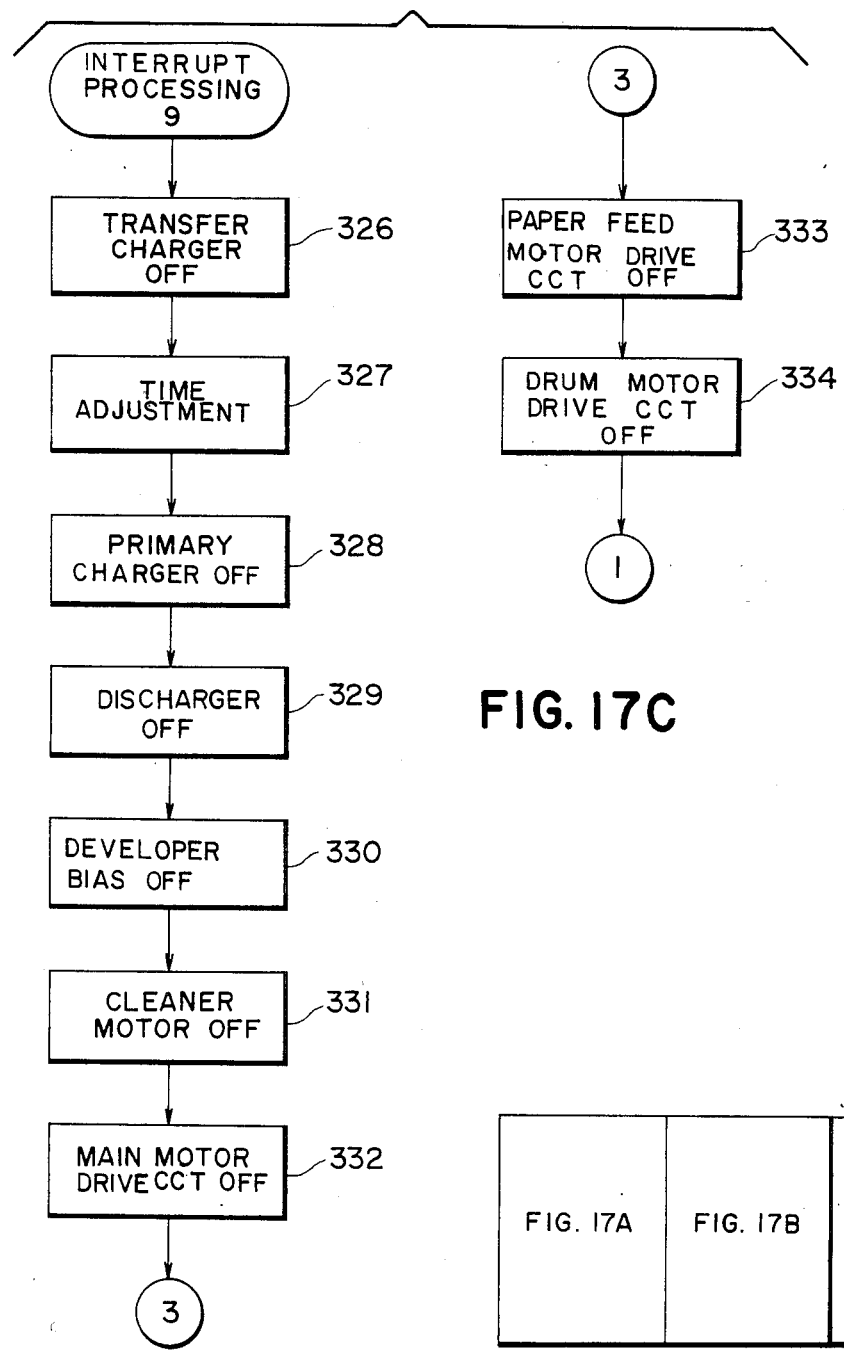
FIGS. 17A, 17B and 17C are assembled to form a flow chart for showing a sequence of control operation.
Figure 17:
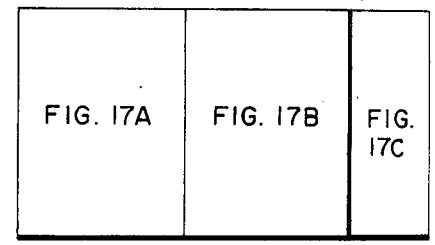
FIG. 17 shows how
Figure 17A:
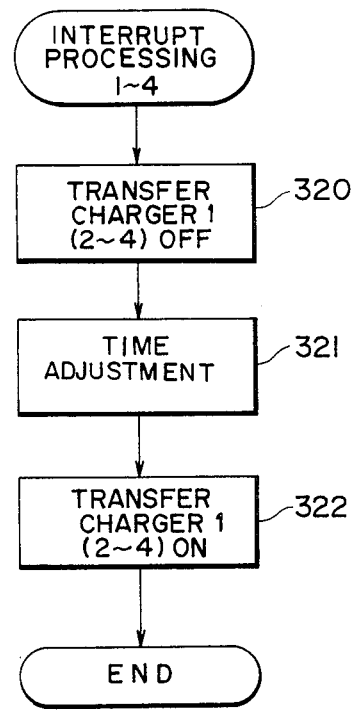
Figure 17B:
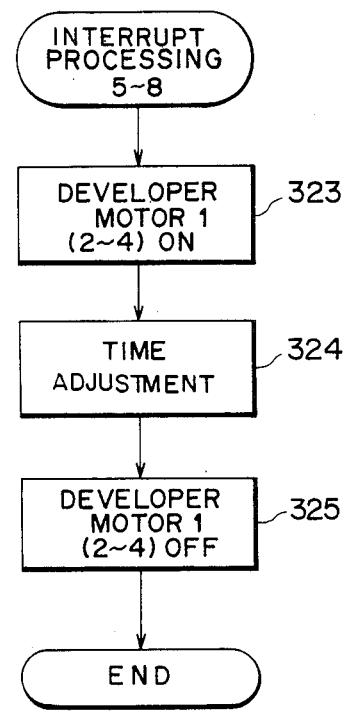

Three types of interrupt processing are provided, as shown in FIGS. 17(A), 17(B) and 17(C). The first interrupt processing in FIG. 17A consists of interrupt processes 1 to 4. Transfer chargers 12Y, 12M, 12C and 12BK corresponding to the respective process units for Y, M, C and BK are controlled. Steps 320 to 322 correspond to the interrupt processes. When a conductive material is used as a connecting material for the seam of the screen belt 2, discharge of the transfer high-voltage current to the conductive member is prevented when these processes are performed. In step 319, the timer process is started so that when the conductive member approaches one of the transfer chargers 12Y, 12M, 12C and 12BK, the turning off operation of the corresponding transfer charger will start in step 320. In step 321, time adjustment is performed until the conductive member moves past the transfer chargers 12Y, 12M, 12C and 12BK. After the time adjustment performed in step 321, one of the transfer chargers 12Y, 12M, 12C and 12BK which has been turned off is turned on again in step 322. In this interrupt process, control is performed by supplying a signal onto the signal lines 424 to 427. The interrupt processing in FIG. 17B consists of interrupt processes 5 to 8. Control of developers 11Y, 11M, 11C and 11BK included in the respective units of Y, M, C and BK is performed. In steps 323 to 325, the developers 11 are controlled so that developing is performed only when the image to be transferred onto the transfer sheet is written onto the photosensitive drum 9 by means of a laser beam with step 324 being a count of the interval between turning on of the developer motor and turning off of the developer motor. In this interrupt process, control is performed by supplying a signal onto signal lines 432 to 435. The third interrupt processing (C) consists of interrupt process 9 and performs a postprocess after printing one sheet. The order of steps 326 to 334 can be arbitrarily selected and these steps can also be performed simultaneously. In this embodiment, considering the particular characteristics of the photosensitive drum 9, the transfer charger 12 is turned off in step 326. Thereafter time adjustment is performed in step 327, and the primary charger 10 is turned off in step 328. In steps 329 to 334, turning off of the charge remover 61, the developer bias source 210, the cleaner 13, the main motor drive circuit 205, the paper feed motor drive circuit 204, and the drum motor drive circuit 202 respectively are performed. After step 334 the respective units are in the ready state, as shown in FIGS. 16A and 16B. Steps 305 and 306 are repeated to await feeding of the next transfer sheet P. In the flow charts, the attraction charger 59 was not described. However, the attraction charger 59 is turned on before paper feed is performed in step 318 and is turned off after paper feed is completed. Accordingly, the transfer sheet P can be satisfactorily attracted toward the screen belt 2. In the embodiment described above, the interrupt processes 1 to 9 are performed by a timer interrupt. However, interrupt can be performed by means of the photointerrupter 60Y, 60M, 60C and 60BK. Furthermore, similar interrupt can be effected by time monitoring means or by detection of the state of the photointerrupters 60Y, 60M, 60C and 60BK.

Image data to be recorded is obtained by a three-tube color TV camera. However, the means for obtaining the image data is not limited to this. For example, image data can be data from a color TV camera or an original reader, communication data, readout data from an optical memory device, or the like.

The printer mechanisms are not limited to those for colors of Y, M, C and BK. The printer mechanisms may be for the three colors excluding BK or those for colors R, G and B with intermediate color printer mechanisms.

The present invention can be similarly applied to an ink jet printer, a thermal printer or the like instead of a laser beam printer.

In summary, according to the present invention, color misregistration of a plurality of colors can be corrected, and a color image with excellent color registration can be obtained. Since the recording positions for the respective colors can be changed, any error in part mounting precision during assembly of the recording apparatus can be easily corrected.

In the embodiment described above, readout of the image data for each color from the frame memory is controlled in accordance with signals V-SYNC and H-SYNC, which are based on the signals BD and Top, thereby controlling the recording position of the image of each color on the recording medium. However, in a system which does not have a frame memory, readout of the image by an original reader can be controlled based on these signals V-SYNC and H-SYNC.

The present invention is not limited to correction of color misregistration in recording a color image but may be used for recording images of different colors at different positions on a recording medium. This allows monitoring of the recording state of images of the respective colors for recording of a final color image.

Although the present invention is described with reference to a particular embodiment, various changes and modifications may be made within the spirit and scope of the present invention.

What is claimed is:

1. Color image recording apparatus for recording a color image on a recording medium, said apparatus comprising:
   a plurality of image forming media;
   means for forming respective images, each of a different color, on each of said image forming media;
   means for sequentially transferring the images respectively formed on said image forming media onto a recording medium;
   means for conveying the recording medium along a predetermined path;
   means for generating a position signal which indicates that the recording medium is at a predetermined position on the predetermined path upstream of one of said image forming media, the image on which is to be first transferred to the recording medium by said transferring means;
   means for designating an area on the recording medium to which the respective images are to be transferred; and
   means for controlling the start timing of the formation of a respective image on said one of said image forming media by said image forming means in accordance with the position signal generated by said position signal generating means and the area on the recording medium designated by said designating means.

2. Color image recording apparatus according to claim 1, wherein said designating means designates a first recording designation position in the conveying direction along which the recording medium is conveyed by said conveying means and a second recording designation position in a transverse direction perpendicular to the conveying direction.

3. Color image recording apparatus according to claim 2, further comprising means for detecting the second recording designation position in the transverse direction, wherein said control means controls the recording timing in the transverse direction according to the position signal generated by said position signal generating means and the second recording designation position.

4. Color image recording apparatus according to claim 1, wherein said position signal generating means includes a detection member for detecting the presence of the recording medium on the conveying path.

5. Color image recording apparatus according to claim 1, further comprising detector means for detecting the position of the recording medium on the predetermined path at positions between respective image recording media.

* * * * *

UNITED STATES PATENT AND TRADEMARK OFFICE
CERTIFICATE OF CORRECTION

PATENT NO. : 4,660,077  Page 1 of 3
DATED : April 21, 1987
INVENTOR(S) : NAOTO KAWAMURA, ET AL.

It is certified that error appears in the above-identified patent and that said Letters Patent is hereby corrected as shown below:

COLUMN 1

Line 67,    "half tone" should read --halftone--.

COLUMN 2

Line 19,    "and" should be deleted.
    Line 22,    "operation;" should read --operation; and--.
    Line 68,    "namely a" should read --namely, a--.

COLUMN 3

Line 7,    "below). which" should read --below) which--.
    Line 31,    "an" should read --a--.
    Line 37,    "warm up" should read --warm-up--.

COLUMN 4

Line 17,    "overlayer" should read --overlaid--.
    Line 52,    "analog to digital" should read --analog-to-digital--.

COLUMN 5

Line 1,    "half tone" should read --halftone--.
    Line 4,    "half tone" should read --halftone--.
    Line 9,    "half tone" should read --halftone--.
    Line 50,    "two value" should read --two-value--.
    Line 66,    "spectfully" should read --spectively--.

UNITED STATES PATENT AND TRADEMARK OFFICE
CERTIFICATE OF CORRECTION

PATENT NO. : 4,660,077

DATED : April 21, 1987

INVENTOR(S) : NAOTO KAWAMURA, ET AL.

It is certified that error appears in the above-identified patent and that said Letters Patent is hereby corrected as shown below:

COLUMN 6

Line 13,   "half tone" should read --halftone--.
    Line 20,   "12" should read --120--.
    Line 36,   "12" should read --120--.

COLUMN 7

Line 66,   "half tone" should read --halftone--.

COLUMN 9

Line 10,   "photo interrupters" should read --photointerrupters--.
    Line 11,   "AND" should read --and--.

UNITED STATES PATENT AND TRADEMARK OFFICE
CERTIFICATE OF CORRECTION

PATENT NO. : 4,660,077                    Page 3 of 3

DATED     : April 21, 1987

INVENTOR(S) : NAOTO KAWAMURA, ET AL.

It is certified that error appears in the above-identified patent and that said Letters Patent is hereby corrected as shown below:

COLUMN 10

Line 65,  "(C)" should read --in FIG. 17C--.

COLUMN 11

Line 20,  "photointerrupter" should read --photointerrupters--.

Signed and Sealed this

Twenty-seventh Day of October, 1987

Attest:

DONALD J. QUIGG

*Attesting Officer*    *Commissioner of Patents and Trademarks*